3,845,081
ANTHRAQUINONE DYESTUFFS
Jean André Paul Kienzle, Creil, and Louis Antoine Cabut, Nogents-Oise, France, assignors to Ugine Kuhlmann, Paris, France
No Drawing. Filed Oct. 13, 1971, Ser. No. 189,029
Claims priority, application France, Oct. 14, 1970, 7037070
Int. Cl. C09b 1/50
U.S. Cl. 260—377                                  7 Claims

ABSTRACT OF THE DISCLOSURE

The present invention relates to dyestuffs of the formula:

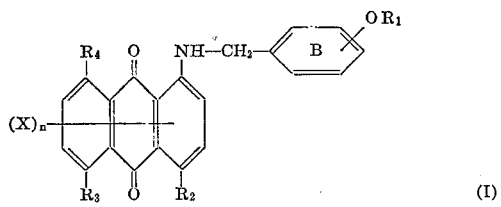

(I)

in which $R_1$ represents a hydrogen atom or an alkyl residue, $R_2$ represents a hydroxy, amino, alkylamino, arylamino or acylamino group or the residue of the formula:

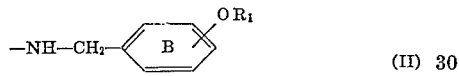

(II)

and $R_3$ and $R_4$ each represent a hydroxy, amino, alkylamino, arylamino, acylamino or nitro group or the residue of formula (II), $R_2$ is different from $R_3$ or $R_4$, X represents a hydrogen or halogen atom or a nitro, cyano, alkoxy, alkyl group or an aryl radical not containing a solubilising substituent and of which the the nucleus linked to the anthraquinone radical contains at least one hydroxy group or an alkoxy, hydroxyalkoxy, alkoxylalkoxy, cycloalkoxy or aryloxy radical, $n$ is 1 or 2 and the nucleus B is unsubstituted or substituted by at least one alkyl or alkoxy group or by at least one halogen atom
It also relates to the production of such dyestuffs and to fibres coloured with such dyestuffs.

---

The present invention relates to new anthraquinone dyestuffs which are particularly advantageous for the colouration of synthetic and artificial fibres.

According to the invention dyestuffs are provided having the general formula:

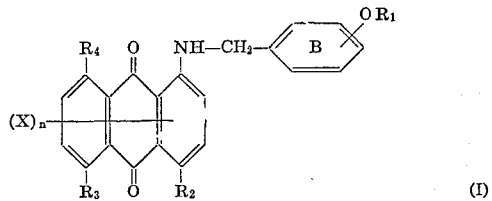

(I)

in which $R_1$ represents a hydrogen atom or an alkyl residue, $R_2$ represents a hydroxy, amino, alkylamino, arylamino or acylamino group or the residue of the formula:

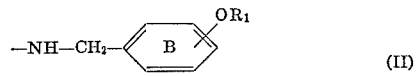

(II)

and $R_3$ and $R_4$ each represent a hydroxy, amino, alkylamino, arylamino, acylamino or nitro group or the residue of formula (II), $R_2$ is different from $R_3$ or $R_4$, X represents a hydrogen or halogen atom or a nitro, cyano, alkoxy or alkyl group or an aryl radical not containing a solubilising substituent and of which the nucleus linked to the anthraquinone radical contains at least one hydroxy group or an alkoxy, hydroxy-alkoxy, alkoxylalkoxy, cycloalkoxy or aryloxy radical, and $n$ is 1 or 2, and the nucleus B may be substituted by at least one alkyl, or alkoxy group or by at least one halogen atom.

The preferred alkyl and alkoxy groups are those containing 1 to 5 carbon atoms since dyestuffs having such groups have better tinctorial efficiency. Such preference for the alkyl and alkoxy groups also applies when they occur in the alkyamino, hydroxyalkoxy or alkoxylalkoxy groups. The aryl groups either as such or when they occur in aryloxy or arylamino groups may be, for example, phenyl groups, unsubstituted or substituted by non-solubilizing substituents. The cycloalkoxy groups may be, for example, cyclohexyloxy which may be substituted by lower alkyl groups. The preferred acylamino groups are those in which the acyl radical is an aliphatic radical containing 1 to 4 carbon atoms or a benzyl radical.

$R_2$ may be identical with $R_3$ or with $R_4$, but $R_2$, $R_3$ and $R_4$ cannot all be identical.

The dyestuffs of formula (I) may be prepared for example by reacting at least one anthraquinone derivative of the general formula:

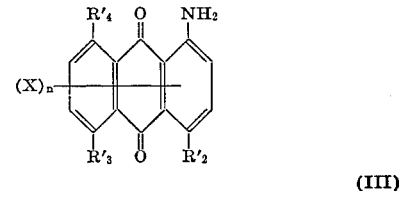

(III)

in which $R'_2$ represents a hydroxy, amino, alkylamino, arylamino or acylamino group, $R'_3$ and $R'_4$ each represent a hydroxy, amino, alkylamino, arylamino, acylamino or nitro group, $R'_2$ is different from $R'_3$ $R'_4$, X and $n$ have the meanings given above, with formol and a compound of the formula:

(IV)

in which $R_1$ and B have the same signficance as above.

$R'_2$ may be identical with $R'_3$ or with $R'_4$, but $R'_2$, $R'_3$ and $R'_4$ cannot all be identical.

This reaction may be carried out for example at ambient temperature or at temperatures between 30° C. and 150° C. and more particularly between 40° C. and 100° C. in an excess of phenol or ether-oxide having of formula IV wherein $R_1$ represents an alkyl residue, taken as solvent. It is possible to replace this excess by a usual organic solvent, such as an aromatic hydrocarbon or a halogenated, nitrated or other derivative thereof, for example, nitrobenzene, chlorobenzene, dichlorobenzenes toluene and xylenes.

Examples of the anthraquinone derivatives which may be used in the process of the invention are 1,5-diamino-4,8-dihydroxy-anthraquinone,
1,8-diamino-4,5-dihydroxy-anthraquinone and their monobrominated derivatives,
1-amino-4,8-dihydroxy-5-nitro-anthraquinone,
1,5-diamino-4,8-dihydroxy-2-methyl-anthraquinone,
1-amino-4,5-dihydroxy-8-monobenzoylamino-anthraquinone,
1,5-diamino-4,8-dihydroxy-3,7-dibromo-anthraquinone,
1,5-diamino-4,8-dihydroxy-4'-hydroxy-3-phenyl-anthraquinone,
1,5-diamino-4,8-dihydroxy-4'-methoxy-3-phenyl-anthraquinone and
1-amino-4,8-dihydroxy-5-anilino-anthraquinone.

Suitable phenolic derivatives include phenol, p-chlorophenol, m-chlorophenol, metacresol, p-methoxyphenol, 3,4-dimethyl-phenol and anisole.

The dyestuffs of formula (I), used alone or in mixtures in dispersed state, are very suitable for the colouration of synthetic or artificial fibres, more particularly fibres based on polyesters, for example, those based on ethylene-glycol polyterephthalate. Such fibres are marketed, for example under the trade marks "Terylene," "Dacron," and "Tergal." These dyestuffs enable full-bodied shades to be obtained as well as a good exhaustion of the dyebath.

The dyestuffs of the invention can be used for example according to the usual methods of dyeing and printing. Thus they may be applied by means of dyebaths containing a dispersion of the dyestuff and advantageously a swelling agent, at temperatures near to 100° C. or at temperatures above 100° C. in a closed apparatus. Pure and full-bodied shades ranging from blue-violet to greenish-blue are obtained which are characterised by very good fastness to light and excellent fastness to sublimation.

The invention is illustrated by the following Examples in which the parts and the percentages are by weight.

EXAMPLE 1

10 parts of 1,5-diamino-4,8-dihydroxy-anthraquinone are added to 50 parts of molten phenol, then 10 parts of 30% formol are introduced and the temperature is maintained at 40–45° C for 4 hours.

The mixture is then diluted in 500 parts of water containing 25 parts of sodium chloride and 25 parts of sodium hydroxide. A deep blue product is precipitated, which is filtered off, washed with water until neutral and dried. 17 parts of 1,5-bis(p-hydroxybenzylamino)-4,8-dihydroxy-anthraquinone are thus obtained as a deep blue powder.

0.5 parts of this powder and 1 part of sodium dinaphthylmethane-disulphonate are ground in 6 parts of water until a fine dispersion is obtained. This mixture is poured into 3000 parts of water and 1.5 parts of 2-hydroxy-diphenyl are added. The dyebath thus prepared is heated to 60° C. and 100 parts of polyester fibres are introduced therein. It is heated up to boiling in a period of 20 minutes and maintained at this temperature for an hour. The fibres are taken out of the bath, rinsed with water and dried. They are dyed a full-bodied blue shade which is fast to light and resistant to heat-fixing and creasing.

Compared with 1,5-diamino-4,8-dihydroxy-anthraquinone, the dyestuff thus prepared enables greener and more full-bodied shades to be obtained and complete exhaustion of the dyebath.

EXAMPLE 2

10 parts of a mixture of equal parts of 1,5-diamino-4,8-dihydroxy-anthraquinone and 1,8-diamino-4,5-dihydroxy-anthraquinone are added to 50 parts of molten 3,4-dimethylphenol, 10 parts of 30% formol are introduced and the temperature is maintained at 70–75° C. The mixture is then diluted in 500 parts of water containing 25 parts of sodium chloride and 25 parts of sodium hydroxide.

The precipitate formed is filtered off, washed with water until neutral and dried. 19.2 parts of a deep blue powder are thus obtained, which consists of a mixture of 1,5-bis-(4',5'-dimethyl-2'-hydroxy-benzylamino)-4,8 - dihydroxy-anthraquinone and 1,8 - bis(4',5' - dimethyl-2'-hydroxy-benzyl-amino)-4,5-dihydroxy-anthraquinone.

This dyestuff, first made into a dispersion, dyes fibres based on polyesters in a full-bodied blue shade having very good fastness to light and sublimation.

EXAMPLE 3

If in Example 2 the 3,4-dimethylphenol is replaced by an equivalent amount of anisole, 13.1 parts of a mixture of 1,5 - bis(4' - methoxy-benzylamino)-4,8-dihydroxy-anthraquinone and 1,8-bis(4'-methoxy-benzylamino)-4,5-dihydroxy-anthraquinone are obtained in the form of a deep blue powder which dyes fibres based on polyesters a similar shade, also having good fastness especially to light and sublimation.

EXAMPLE 4

10 parts of a mixture containing 5 parts of 1,5-diamino-4,8-dihydroxy-2-bromo-anthraquinone and 5 parts of 1,8-diamino-4,8-dihydroxy-2-bromo-anthraquinone are mixed with 50 parts of molten phenol, then 10 parts of 10% formol are introduced and the temperature is maintained for 4 hours at 40–50° C.

The excess phenol is then entrained in steam, the product is filtered off, washed with water until neutral and dried. 12.8 parts of a deep blue powder are thus obtained which dyes fibres based on polyesters a very slightly greenish blue shade having good fastness especially to light and sublimation. This dyestuff consists of a mixture of 1 - amino-4'-hydroxy-5-benzylamino-4,8-dihydroxy-2-bromo-anthraquinone and 1-amino-4'-hydroxy-8-benzyl-amino-4,5-dihydroxy-2-bromo-anthraquinone.

If the phenol is replaced by p-chlorophenol, 12.5 parts of a dyestuff are obtained which dyes fibres based on polyesters in similar shades also having good fastness especially to light and sublimation.

EXAMPLE 5

10 parts of 1,5-diamino-4,8-dihydroxy-3,7-dibromo-anthraquinone are mixed with 50 parts of phenol and 10 parts of formol are then introduced. The temperature is then maintained at 40–50° C. for 4 hours, followed by dilution of the mixture in 500 parts of water containing 25 parts of sodium chloride and 25 parts of sodium hydroxide. The dyestuff is precipitated, and is filtered off, washed until neutral and dried. It consists of a mixture of 1,5 - bis - (p - hydroxy-benzylamino)-4,8-dihydroxy-3,7-dibromo-anthraquinone and 1-amino-5-(p - hydroxy-benzylamino)-4,8-dihydroxy-3,7-dibromo-anthraquinone.

When made into a dispersion, this dyestuff dyes fibres based on polyesters a blue shade having good fastness especially to light and sublimation.

Compared with 1,5-diamino - 4,8 - dihydroxy-3,7-dibromo-anthraquinone, which dyes fibres based on polyesters in very reddish blue shades, which are dull and have little body, the dyestuff thus obtained enables brighter and more full-bodied blue shades to be obtained. The dyebath is then completely exhausted.

EXAMPLE 6

10 parts of 1,5-diamino - 4,8 - dihydroxy-4'-methoxy-3-phenyl-anthraquinone and 10 parts of formaldehyde are introduced at 45° C. into 50 parts of molten phenol, and the mixture is heated at 45–50° C. for 6 hours and then poured into a solution of 25 parts of sodium hydroxide in 500 parts of water. The precipitate is filtered off, washed and dried. 14 parts of a deep blue powder are thus obtained, which consists of 1-amino-4'-hydroxy-5-benzyl-amino - 4,8 - dihydroxy - 4' - methoxy-3-phenyl-anthraquinone. This dyestuff, when dispersed, dyes fibres based on polyesters a very full-bodied greenish blue shade having good fastness to light and an excellent resistance to heat-fixing and creasing.

If in this Example, the mixture is heated at 90–100° C. instead of at 45–50° C. then 17.8 parts of a dyestuff are obtained which dyes fibres based on polyesters in a similar shade also having good fastness especially to light and sublimation.

Analogous dyestuffs are obtained if p-chlorophenol is used instead of the phenol employed in this Example.

EXAMPLE 7

10 parts of a mixture of equal parts of 1-amino-4,8-dihydroxy-5-benzoylamino - anthraquinone and 1-amino-4,5-dihydroxy-8-benzoylamino - anthraquinone and 10 parts of 30% formol are introduced at 45° C. into 50 parts of phenol. The temperature is maintained at 45–50°

C. for 4 hours and the procedure is then as in Example 1. 13 parts of a mixture consisting of 4'-hydroxy-1-benzylamino - 4,8 - dihydroxy - 5 - benzoyl-amino-anthraquinone and 4' - hydroxy - 1 - benzylamino-4,5-dihydroxy-8-benzoylamino-anthraquinone are obtained. This dyestuff dyes fibres based on polyesters in a full-bodied blue shade which is fast to light and sublimation.

In comparison, the starting monobenzoyl derivatives give a distinctly more reddish shade.

Analogous dyestuffs are obtained when phenol is replaced by p-methoxyphenol.

EXAMPLE 8

10 parts of 1-amino-4,8-dihydroxy-5-phenylamino-anthraquinone are dissolved at 45–50° C. in 50 parts of m-chlorophenol containing 10 parts of 30% formol. This temperature is maintained for 6 hours and the procedure is then as described in Example 1. 12.1 parts of 2'-chloro-4' - hydroxy - 1 - benzylamino-4,8-dihydroxy-5-phenylamino-anthraquinone are thus obtained.

The dyestuff in dispersed form, dyes fibres based on polyesters in full-bodied greenish-blue shades having good fastness especially to light and sublimation.

We claim:

1. Dyestuffs of the formula:

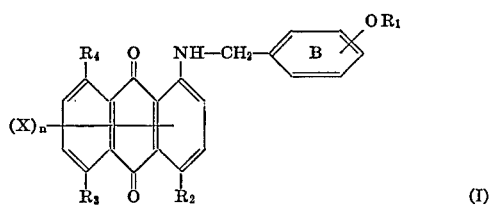

(I)

in which $R_1$ represents a hydrogen atom or in which $-OR_1$ represents a methoxy group, wherein $-OR_1$ is an ortho- or para-substituent, $R_2$ represents a hydroxy group and $R_3$ represents a hydroxy, amino, anilido, benzoylamino, nitro, or the residue of the formula:

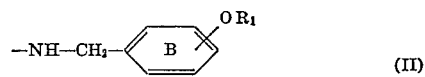

(II)

and $R_4$ represents hydroxy, amino, benzoylamino, or the residue of formula (II), $R_2$ is different from $R_3$ or $R_4$, X represents a hydrogen atom, bromo, methoxy phenyl, hydroxy phenyl, or methyl radical not containing a solubilizing substituent, $n$ is 1 or 2 and nucleus B is unsubstituted or substituted by at least one methyl and up to two methyl groups, or by one chloro group.

2. Dyestuffs as claimed in claim 1 wherein the alkyl and alkoxy groups contain up to 5 carbon atoms.

3. The 1,5-bis-(p-hydroxybenzylamino)-4,8-dihydroxyanthraquinone.

4. The 1-amino-4'-hydroxy - 5 - benzylamino-4,8-dihydroxy-2-bromoanthraquinone.

5. The 1-amino-4'-hydroxy - 8 - benzylamino-4,5-dihydroxy-2-bromoanthraquinone.

6. The 1-amino-4'-hydroxy - 5 - benzylamino-4,8-dihydroxy-4'-methoxy-3-phenylanthraquinone.

7. The 4'-hydroxy-1-benzylamino-4,8-dihydroxy-5-benzoylaminoanthraquinone.

References Cited

FOREIGN PATENTS 598,154   3/1934   Germany _____ 260—380

OTHER REFERENCES

March: Advanced Organic Chemistry, p. 424 (1968).
Abdullaev et al.: Chem. Abstracts *60* 1627e (1963).

ROBERT GERSTL, Primary Examiner

U.S. Cl. X.R.

8—34, 40; 260—378, 380